W. J. LLOYD.
ELECTRIC DEMAND INSTRUMENT.
APPLICATION FILED JAN. 16, 1905.
919,605.
Patented Apr. 27, 1909.
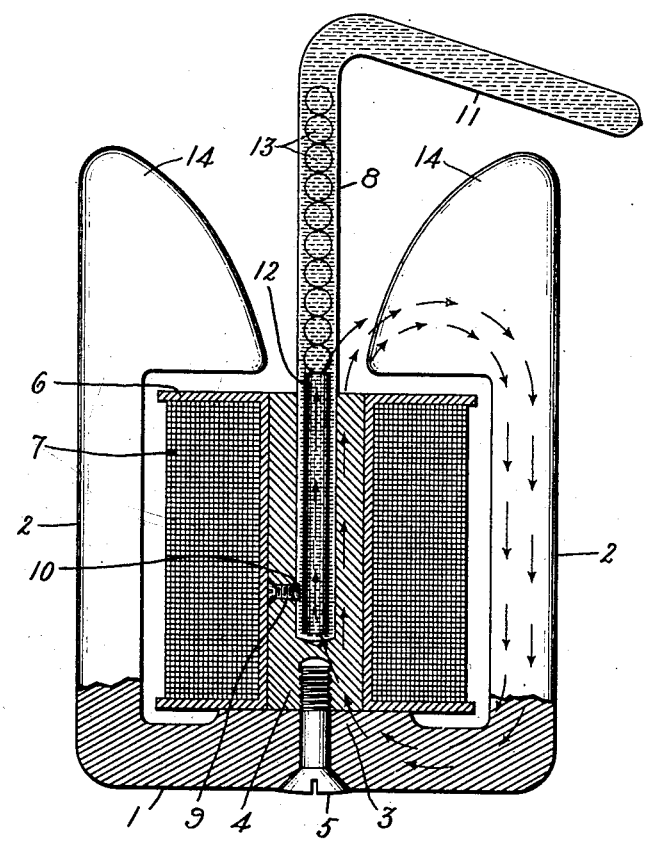
Witnesses:
George H. Tilden.
Helen Orford
Inventor:
William J. Lloyd,
by Albert G. Davis
Att'y.

UNITED STATES PATENT OFFICE.

WILLIAM J. LLOYD, OF PITTSFIELD, MASSACHUSETTS, ASSIGNOR, BY MESNE ASSIGNMENTS, TO GENERAL ELECTRIC COMPANY, A CORPORATION OF NEW YORK.

ELECTRIC DEMAND INSTRUMENT.

No. 919,605.

Specification of Letters Patent.

Patented April 27, 1909.

Application filed January 16, 1905. Serial No. 241,218.

*To all whom it may concern:*

Be it known that I, WILLIAM J. LLOYD, a citizen of the United States, residing at Pittsfield, in the county of Berkshire and State of Massachusetts, have invented certain new and useful Improvements in Electric Demand Instruments, of which the following is a specification.

My present invention relates to an electric measuring instrument adapted to record the limit of a demand or condition in an electric circuit. The particular instrument which I have hereinafter described and illustrated is adapted to record the maximum flow of current in an electric magnetizing coil during a definite period of time.

The various features of novelty which characterize my invention are pointed out with particularity in the claims annexed to and forming a part of this specification. For a better understanding of the invention, however, reference may be had to the accompanying drawing, which is an elevation with parts in section, illustrating an instrument embodying my invention, and the descriptive matter relating thereto.

In the drawing, 1 represents a mass of magnetic material which forms a part of the framework of the instrument and the major portion of its magnetic circuit. The magnetic material 1 may or may not be laminated. The member 1 comprises two vertical legs or parts 2 which are integrally connected at their lower ends by a yoke portion 3. A cylindrical member 4 of magnetic material is secured to the yoke parallel to and midway between the legs 2 by a screw 5. A spool 6 carrying a magnetizing coil 7 surrounds the core 4.

A channeled element in the form of a bent tube 8 preferably formed of glass is secured in any suitable manner, as by means of set screws 9, in a socket formed for the purpose in the core member 4. Preferably a piece 10 of yielding material is inserted between the tube and the set-screw. It will be observed that the construction employed for securing the tube 8 in place allows of its vertical adjustment relative to the core. The tube 8 comprises a main vertical portion which extends in line with the axis of the core 4, and a downwardly-turned portion 11 which extends from the upper end of the main portion. A plunger 12 formed of suitable magnetic material such as soft iron is placed in the lower end of the tube 8 and is so proportioned as to move freely in the hollow of the tube. When the member 12 is in its extreme lower position its upper end projects slightly above the upper end of the core 4.

A number of solid bodies 13 which may be in the form of balls formed out of glass, non-magnetic metal, or the like, are placed in the main portion of the tube above the plunger 12. The bodies 13 are of a diameter slightly less than that of the bore of the tube 8 so as to have free movement therein. The number of balls placed in the tube are sufficient to extend nearly but not quite to the bend in the tube when the member 12 is in its extreme lower position. After the member 12 and balls 13 are placed in the tube the remainder of the space in the latter is filled with some suitable damping fluid such as glycerin or the like and the tube is then preferably hermetically sealed.

The upper ends of the members 2 are enlarged to form polar pieces 14. The pole-pieces 14 extend inwardly over the upper end of the spool 6 so that their inner lower edges are separated a distance about equal to that of the diameter of the core member. In the particular construction illustrated the inner faces of the pole-pieces 14 above the lower edges recede from the axis of the core member 4 at an angle of approximately 30°.

On the passage of an electric current through the winding 7 a magnetic flux is set up which pasess through circuits each comprising a core member 4 and member 12, one of the enlargements 14, the corresponding member 2 and a portion of the base 3. One of the flux paths is indicated by the arrows in the drawing.

It will be observed that each member 2, the corresponding polar enlargement 14, adjacent half of the yoke or base 3, and core member 4, comprise a nearly closed magnetic circuit. When the member 12 is in its normal position at the bottom of the tube 8 its upper end is about on a level with the lower edges of the polar enlargements 14. Upon the passage of current through the coil 7 the member 12 is moved upward against the action of gravity to a position in which the reluctance of the path between the upper end of the core 4 and the adjacent polar projection 14 is less than in the original position of the member.

As the current in the winding 7 increases and the flux densities in the core member 4 and the inner lower tips of the polar enlargements 14 are increased, the member 12 is raised higher and higher. By choosing the proper proportion and configuration of parts, the elevation of the member 12 within limits can be made directly proportional to the current flow in the coil 7. Upon a definite upward movement of the member 12 in response to a predetermined current flow in the coil 7, the upper ball or body 13 will be moved to the bend in the tube 8 and will roll down into the portion 11. On a further increase of current flow in the coil 7 to a second predetermined amount, another ball or body 13 will be moved into the portion 11 of the tube. Similarly, further increases in the amount of current flow occurring from time to time will cause other bodies 13 to be moved from the chamber formed by the main portion of the tube 8 into the chamber formed by the portion 11. The balls will only be transferred from the main portion of the tube to portion 11 when the predetermined flow of current is continued for an appreciable period of time as the damping fluid will prevent the transfer of the balls in response to momentary increases in current flow.

When the period during which it is desired to obtain a record of the maximum current flow has expired the balls or bodies 13 in the extension 11 may be returned to the main portion of the tube by tilting the latter and allowing the balls to run back to their original position. By changing the position of the tube relative to the core 4 the instrument may be adjusted more or less to obtain a proper record.

While in the particular instrument shown the record obtained is of the variations of current flow in the coil 7, it will be readily understood that this variation may be responsive to the flow of current in another electric circuit or to the potential or other condition of said other circuit.

While I have hereinbefore described and illustrated the best form of my invention now known to me, it will be obvious to those skilled in the art that changes can be made in the form of the invention disclosed without departing from the spirit thereof.

What I claim as new and desire to secure by Letters Patent of the United States, is,

1. In combination, a solenoid, a fixed hollow core therein, a polar extension outside of said solenoid and serving as a path for the magnetic lines of force from end to end of said hollow core, and a movable core located within said hollow core and adapted to move outwardly as the magnetomotive force increases.

2. In combination, a solenoid, a fixed hollow core having an extension therefrom surrounding said solenoid and serving to produce a path which the lines of magnetic force will tend to follow, a movable core within said hollow core adapted to move outwardly as the magnetomotive force increases, and means for indicating the maximum movement of the movable core.

3. In combination, a solenoid, a fixed core and pole pieces magnetized thereby, and a movable core which moves outwardly from the solenoid as the magnetomotive force increases.

4. In combination, a solenoid, a core in a plurality of sections telescopically arranged, and pole pieces so arranged that an increase in the magnetomotive force due to an increase in current in the solenoid will cause the core to lengthen.

5. In combination, a solenoid, a fixed core, a second core slidable within the fixed core, and pole pieces so arranged that an increase in magnetomotive force causes the second core to move outwardly from the fixed core.

6. In combination, a solenoid, a fixed core and pole pieces magnetized thereby, a movable core which moves outwardly from the solenoid as the magnetomotive force increases, and means for indicating the maximum movement of the movable core.

7. In combination, a solenoid, a core with a plurality of sections of magnetic material telescopically arranged, and pole pieces so arranged that an increase in the magnetomotive force due to increase in current in the solenoid will cause the core to lengthen, and means for indicating the maximum length to which the core has been extended.

8. In combination, a solenoid, a fixed core, a second core slidable within the fixed core, pole pieces so arranged that increase in the magnetomotive force causes the second core to move outwardly from the fixed core, and means for indicating the maximum movement of the second core.

9. In combination, a tube formed in two portions, a magnetic plunger located in one portion of said tube, a series of balls normally located in the same portion, and electromagnetic means for moving said plunger to transfer one or more of said balls to the other portion of said tube.

10. In an electric instrument, a bent glass tube, a plunger of magnetic material located in one portion of said tube, electromagnetic means for moving said plunger relative to said tube, and solid indicating bodies moved through the bend of said tube by said plunger to obtain a record of the maximum movement of said plunger.

11. In combination, a hermetically-sealed tube containing a viscous liquid, a plunger of magnetic material located in said tube, electromagnetic means for changing the position of said plunger with respect to said tube, and indicating means in said tube moved through said liquid by said plunger to obtain a permanent record of the maximum change in the position of said plunger.

12. In combination a stationary element having a closed chamber or channel formed in it, a solid indicating body located in said chamber or channel, and electromagnetic means for permanently changing the location of said body in said element in response to a predetermined change in the condition of an electric circuit.

13. In combination an element having a channel formed in it and filled with viscous liquid, a mass of magnetic material located in said channel, electromagnetic means without said channel for moving said mass of electromagnetic material relative to said channel, and a solid indicating body moved through the channel and permanently changed in location in said channel by said mass of magnetic material to record its maximum movement relative to the channel.

14. In a measuring instrument, a core of magnetic material, a plunger moving in line with the axis of said core, and a pole-piece adjacent the line of movement of the plunger, the face of said pole-piece receding from the line of movement of the plunger at an acute angle.

15. In a measuring instrument, magnetic material arranged to form a closed-magnetic path except for a short gap between one portion of said magnetic material and another portion above the first-mentioned portion, a coil for magnetizing said material, and a movable mass of magnetic material moved upward under the action of the magnetizing coil to a position in which the reluctance of the gap is diminished in a path which does not change the length of said gap.

In witness whereof, I have hereunto set my hand this third day of January, 1905.

WILLIAM J. LLOYD.

Witnesses:
ERNEST HARKER,
ETHEL M. WEBB.